(12) United States Patent
Wang

(10) Patent No.: US 8,077,907 B2
(45) Date of Patent: Dec. 13, 2011

(54) SYSTEM AND METHOD FOR THE GENERATION OF CORRELATION-BASED DIGITAL WATERMARKS

(75) Inventor: Shen-ge Wang, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 1135 days.

(21) Appl. No.: 11/897,772

(22) Filed: Aug. 31, 2007

(65) Prior Publication Data

US 2009/0060261 A1 Mar. 5, 2009

(51) Int. Cl.
G06K 9/00 (2006.01)
H04L 9/32 (2006.01)

(52) U.S. Cl. .................................... 382/100; 713/176

(58) Field of Classification Search .............. 382/100, 382/232, 240; 380/51, 54, 201, 210, 252, 380/287; 370/522–529; 713/176, 179; 348/461, 348/463; 283/72, 74–81, 85, 913; 358/3.28
See application file for complete search history.

(56) References Cited

U.S. PATENT DOCUMENTS

| | | | |
|---|---|---|---|
| 4,149,183 A | 4/1979 | Pellar et al. | |
| 4,196,451 A | 4/1980 | Pellar | |
| 5,537,223 A * | 7/1996 | Curry | 358/3.28 |
| 6,252,971 B1 | 6/2001 | Wang | |
| 6,614,914 B1* | 9/2003 | Rhoads et al. | 382/100 |
| 6,798,539 B1 | 9/2004 | Wang et al. | |
| 6,885,757 B2* | 4/2005 | Bloom et al. | 382/100 |
| 7,215,444 B2* | 5/2007 | Hains | 358/3.09 |
| 7,352,879 B2* | 4/2008 | Wang | 382/100 |
| 7,894,626 B2 | 2/2011 | Wang et al. | |
| 2004/0052401 A1* | 3/2004 | Suzaki | 382/100 |
| 2006/0120557 A1 | 6/2006 | Wang | |
| 2008/0019559 A1 | 1/2008 | Wang et al. | |
| 2009/0060258 A1 | 3/2009 | Wang et al. | |
| 2009/0060262 A1 | 3/2009 | Wang | |

* cited by examiner

*Primary Examiner* — Abolfazl Tabatabai
(74) *Attorney, Agent, or Firm* — Duane C. Basch; Basch & Nickerson LLP

(57) ABSTRACT

Disclosed are systems and methods directed to digital watermarks, and more particularly, the generation of invisible correlation-based digital watermarks embedded in halftone images.

17 Claims, 7 Drawing Sheets

# SYSTEM AND METHOD FOR THE GENERATION OF CORRELATION-BASED DIGITAL WATERMARKS

CROSS-REFERENCE TO COPENDING APPLICATIONS

Attention is directed to the co-pending applications by S. Wang filed concurrently herewith: U.S. application Ser. No. 11/897,826, filed Aug. 31, 2007 (US 2009/0060262), entitled "SYSTEM AND METHOD FOR THE GENERATION OF MULTI-LAYER CORRELATION-BASED DIGITAL WATERMARKS;" and U.S. application Ser. No. 11/848,908, filed Aug. 31, 2007, (US 2009/0060258, and U.S. Pat. No. 7,894,626), entitled "SYSTEM AND METHOD FOR THE GENERATION OF MULTIPLE ANGLE CORRELATION-BASED DIGITAL WATERMARKS," and the disclosure found in these co-pending applications is hereby incorporated by reference in its entirety. The systems and processes of the above-identified and co-pending applications may be selected for their teaching and support of the present application and various embodiments thereof.

Disclosed in embodiments herein are methods and systems for generation of digital watermarks, and more particularly, the generation of invisible, correlation-based digital watermarks embedded in halftone images.

BACKGROUND AND SUMMARY

Prior patents, such as U.S. Pat. No. 6,252,971 for "Digital watermarking using phase-shift stoclustic screens," by S. Wang, hereby incorporated by reference in its entirety, describe a method to embed correlation-based phase-shift digital watermarks into halftone screens. By overlaying a transparency on the prints generated by the special halftone screen, for example as a public key, invisible watermarks can be retrieved. For color images, the watermark was embedded into all or a selected color channel in a dot-on-dot arrangement.

Disclosed in embodiments herein is a method for digital watermarking of an image, comprising: receiving the image to be watermarked; determining the watermark to be embedded in the image; embedding an invisible digital watermark into the image using a multi-dimensional threshold operation, wherein at least one input thereto is a phase shift value; and outputting the watermarked image containing the embedded invisible digital watermark.

Further disclosed in embodiments herein is a method for digital watermarking of an image, comprising: receiving the image to be watermarked; determining a watermark to be embedded in the image; embedding the watermark into the image using a multi-dimensional threshold array, wherein at least one input thereto is a phase shift value; and outputting the watermarked image containing the embedded digital watermark, wherein the image includes an invisible digital watermark.

Also disclosed herein is a system for digital watermarking of an image, comprising: an input image source; image memory for storing the input image to be watermarked; watermark memory for storing the watermarks to be embedded in the image; and an image processor for embedding a plurality of invisible digital watermarks into the image, said image processor including a multi-dimensional threshold array where at least one input thereto is a phase shift value, and wherein the watermark is embedded into the image

BRIEF DESCRIPTION OF THE DRAWINGS

FIG. 7A depicts an exemplary output image (black/white) having a watermark embedded whereas

The various embodiments described herein are not intended to limit the invention to those embodiments described. On the contrary, the intent is to cover all alternatives, modifications, and equivalents as may be included within the spirit and scope of the appended claims.

DETAILED DESCRIPTION

As more particularly set forth below, the disclosed system and methods are directed to the generation of halftone prints with embedded correlation-based digital watermarks, such that the invisible watermarks may be retrieved or viewed by overlaying a public key on the prints.

Figure 1A:
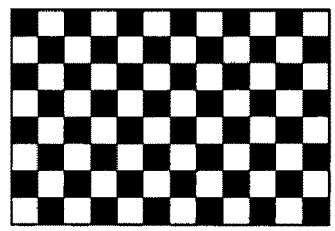
FIGS. 1A and 1B are exemplary representations of halftone patterns and FIGS. 1C-1D illustrate the effect achieved by overlaying the patterns of FIGS. 1A and 1B.
Figure 1B:
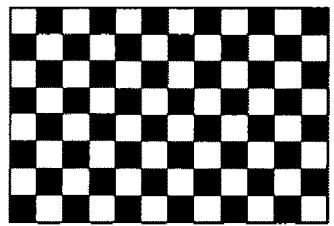
Figure 1C:
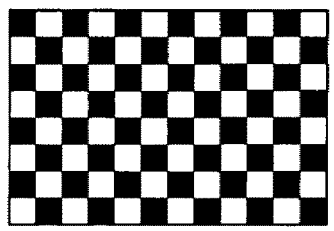
Figure 1D:

The basics of phase-shift based digital watermarks, or correlation-marks, are described in U.S. Pat. No. 6,252,971 for "Digital watermarking using phase-shift stoclustic screens," by S. Wang, previously incorporated herein by reference. Briefly, if two similar cluster halftone patterns are superimposed on each other, the output appearances can differ significantly depending on the relative positions, or the phase shift, of the two patterns. For example, the two checkerboard patterns depicted in FIGS. 1A and 1B are essentially the same, except that the pattern in FIG. 1B is a shifted version of FIG. 1A with an exactly "one-box width" shift. If the two patterns of FIGS. 1A and 1B, are superimposed on each other with a perfect alignment, the result, shown as A&B, would be a complete black as depicted in FIG. 1D. On the other hand, overlapping of A with A itself, which can be considered a version of A with a zero-shift, should be identical to the original pattern A, and the result is depicted in FIG. 1C.

Figure 2A:
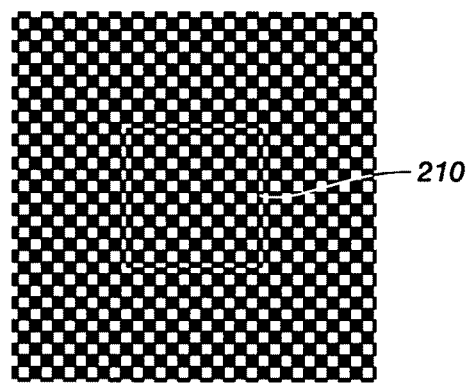
FIGS. 2A-C are exemplary representations of an aspect of embodiments showing the phase shifting of only a portion of a halftone image.
Figure 2B:
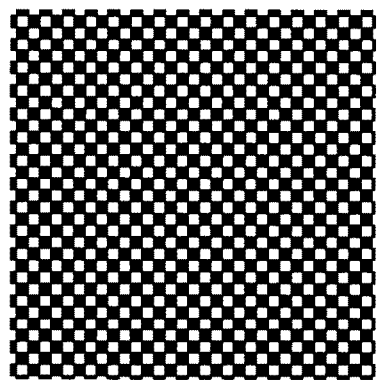
Figure 2C:
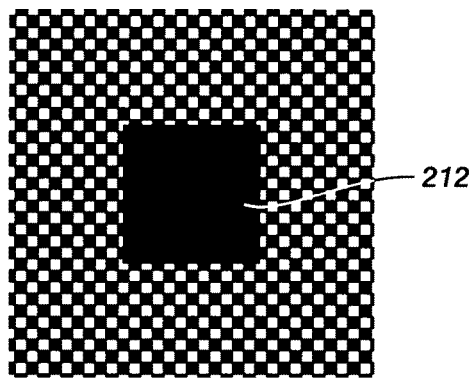

Turning next to FIGS. 2A-2C, there are depicted exemplary representations of an aspect of embodiments. For example, it is possible to shift only a portion of the halftone pattern, e.g., the central portion or region 210. The desired overlay effect with a reference, or a "public key", represented by the FIG. 2B, is illustrated by the result in FIG. 2C.

The example depicted in FIGS. 2A-2C is a simple demonstration for the phase-shift watermark technique. The shifted central part 210 in the picture may be considered as a square watermark, which is retrieved as a black square 212 in the overlay of FIG. 2C. The shift required for an optimal retrieval is equal to a half period of the halftone structure, or $\pi$, in a general mathematic term. The problem with a simple "insertion" is that the boundaries between the shifted portion and the balance of the image are quite visible in FIG. 2B. To hide the seam, the phase jump from zero to π should be replaced by a smooth phase transition.

In U.S. Pat. No. 6,252,971 to S. Wang, the phase transition was achieved differently depending on the different geometries of the phase jump. Twelve basic transition "tiles" were categorized as left-to-right, right-to-left, top-down, bottom-up, and upper-left inner corner, upper-left outer corner, etc. To embed a watermark pattern into halftone images, a large stoclustic (stochastically clustered) halftone screen was created by a tiling process that combined different transition tiles together. One improvement found in the disclosed system and methods is that smaller watermark patterns may be embedded, whereas the tiling process required a larger (multiple tile) stoclustic halftone screen.

Figure 3A:
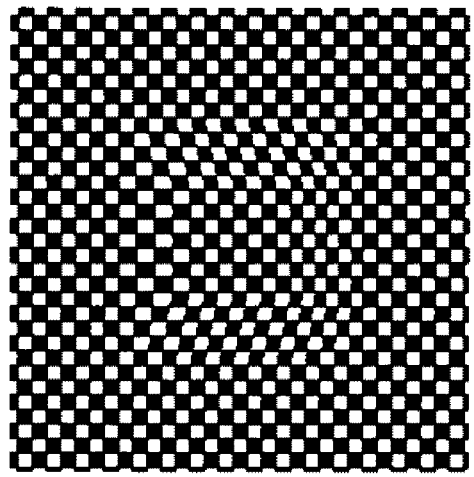
FIGS. 3A-B are representative examples of images processed in accordance with an aspect of the disclosed embodiments.
Figure 3B:
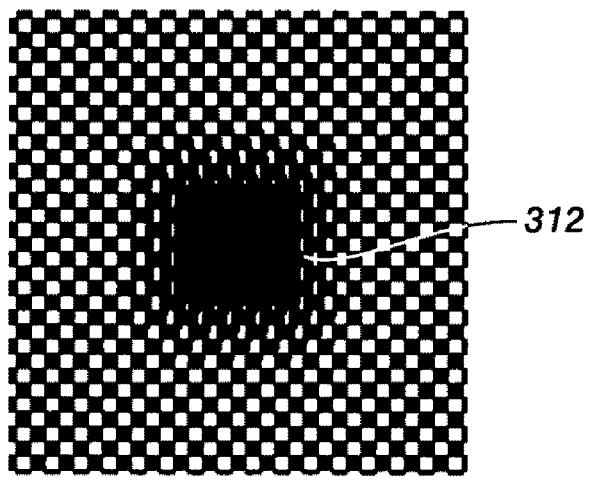

As an example of the advantages of the disclosed embodiments, considering the region 210 in the example in FIGS. 2A-C above as a desired watermark, with the phase transition, the halftone output with the watermark pattern embedded looks like FIG. 3A, where the watermark boundary about the central region is much less visible than in FIG. 2A. When a reference key such as FIG. 2B is placed atop the halftone pattern of FIG. 3A, a somewhat blurred square such as depicted in region 312 in FIG. 3B will be retrieved as the watermark.

The main drawback of the earlier methods is that the stoclustic screen generated by a tiling process is usually very large, even if the desired watermark pattern is as simple as a normal letter. To achieve a smooth transition for a complete phase jump from zero to π, each tile has to be large enough to contain more than just a few clusters. Otherwise, noticeable texture and/or color changes along edges will make the embedded watermark visible in the halftone output. For complicated watermark patterns, the composed stoclustic screens have to be as large as scaled original watermark patterns by a factor approximating the size of basic transition tiles. Therefore, the information capacity of the watermark embedded into each page is quite limited and is not generally applicable to any multi-bit gray scale image. Also, implementing run-time watermark embedding for variable data is not a trivial task because different stoclustic screens needed to be generated for different watermark patterns.

Accordingly, one aspect disclosed herein is applicable in conventional screen halftoning, where a two-dimensional threshold array (i.e. the halftone screen) is used for halftoning the input image. The threshold value for a particular pixel is chosen from the screen based solely on the spatial coordinates, x and y, of the pixel. Instead, the correlation or digital watermark embedding method uses the input of an additional variable or dimension, in one embodiment a three-dimensional threshold array with an additional dimension, specified by the phase shift, or more particularly the phase shift relative to an initial zero-shift halftone screen. During the halftone process, the threshold value for each pixel is chosen using not only the spatial coordinates, but also the phase shift. As an example, the threshold value may be selected from the three-dimensional array (e.g., array 652 in FIG. 6) by specifying the spatial coordinates x and y, as well as a desired phase shift s. In the following discussion T(x, y, s) is employed to represent the halftone threshold value as a function of variables x, y and s.

Figure 4:
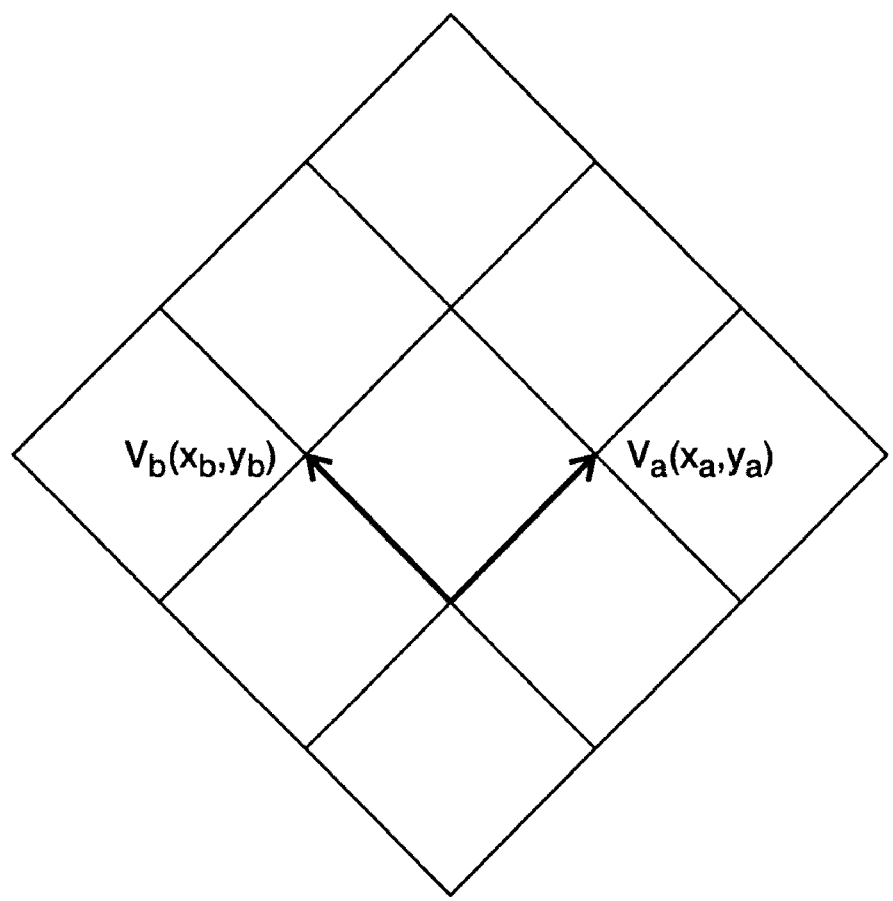
FIG. 4 is a vectorized representation of the geometry of a cluster screen used in accordance with the disclosed system and method.

Using a vector notation, the geometry of a cluster screen can be specified by two spatial vectors, $V_a(x_a, y_a)$ and $V_b(x_b, y_b)$, as shown in FIG. 4. As an example, a 45-degree, 106 line-per-inch (LPI) cluster screen for a 600 dot-per-inch (DPI) printer can be represented by two vectors, $V_a(4, 4)$ and $V_b(-4, 4)$.

For halftoning images specified by 8 bits, or gray levels between 0 to 255, a common design of the two-dimensional threshold array with a given cluster geometry can be described mathematically as $$T(x,y)=128-127\cdot\{\cos[k\pi(x\cdot y_a+y\cdot x_a)]+\cos[k\pi(x\cdot y_b+y\cdot x_b)]\}/2, \quad (1)$$

where k is a scaling factor constant.

The equation, sometimes referred to as the dot profile, provides round-dot or round-hole shapes for the halftone outputs in the high light or the shadow part of an image, and checkerboard-like patterns for the middle tones. This halftone appearance is also close to that achieved by traditional off-set printing technologies and adapted by many digital halftoning methods; for example U.S. Pat. Nos. 4,149,183 to R. J. Pellar et al and U.S. Pat. No. 4,196,451 to R. J. Pellar. The dot profile T(x, y) in Equation 1 is used as the initial zero-shift halftone screen, or T(x, y, 0). The three-dimensional threshold array, which is also a function of the phase shift used for watermark embedding, can be obtained by using a slight modification of Equation 1, and expressed as $$T(x,y)=128-127\cdot\{\cos[k\pi(x\cdot y_a+y\cdot x_a)+s]+\cos[k\pi(x\cdot y_b+y\cdot x_b)+s]\}/2, \quad (2)$$

where s is the phase shift in radians.

The resolution of the phase shift depends on the application. In general, a higher resolution provides better watermark hiding but requires larger memory space to store the three-dimensional array. Practically, for most applications it is possible choose N, the number of steps for a linear phase transition from zero to π, equal to 255. Therefore, it is possible to interpret the gray-levels in terms of desired phase shift. To embed a black/white watermark into halftone images, a π shift for all the black areas and no shift for the white background is needed. Consider using 0 for the white and 255 for a complete black, we may interpret the white, or the gray level 0, as a zero phase shift and the complete black, or the gray level 255, as a π phase shift. In other words, $$s=g\cdot\pi/N, \quad (3)$$

where g is the gray level, N=255 is the total number of gray levels and s is the phase shift. As will be appreciated, a smooth phase transition may be necessary to hide seams caused by the imposition of the watermark image.

Figure 5A:
FIGS. 5A and 5B are representative illustrations of watermark images.
Figure 5B:
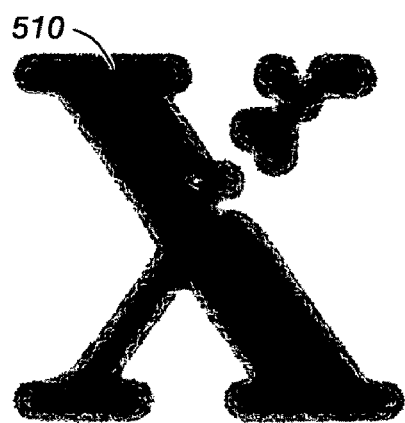

Referring to FIGS. 5A and 5B, the desired phase transition can be represented by a blurred image, such as shown in FIG. 5B, which may be produced from the original bi-level watermark in FIG. 5A, wherein all gray levels between 0 and 255 in the blurred image can be interpreted as intermediate steps between phase zero and phase π. The blurring process may be conducted using well-known low-pass filtering methods. The proper low-pass filters used in the process can be determined in practice by balancing the watermark hiding effect and the contrast of retrieved watermarks. Experimental results suggest that the area of the low-pass filter should be large enough to cover a plurality of clusters, more particularly at least about ten clusters, to provide a satisfactory result.

Watermark Embedded Halftoning

Figure 6:
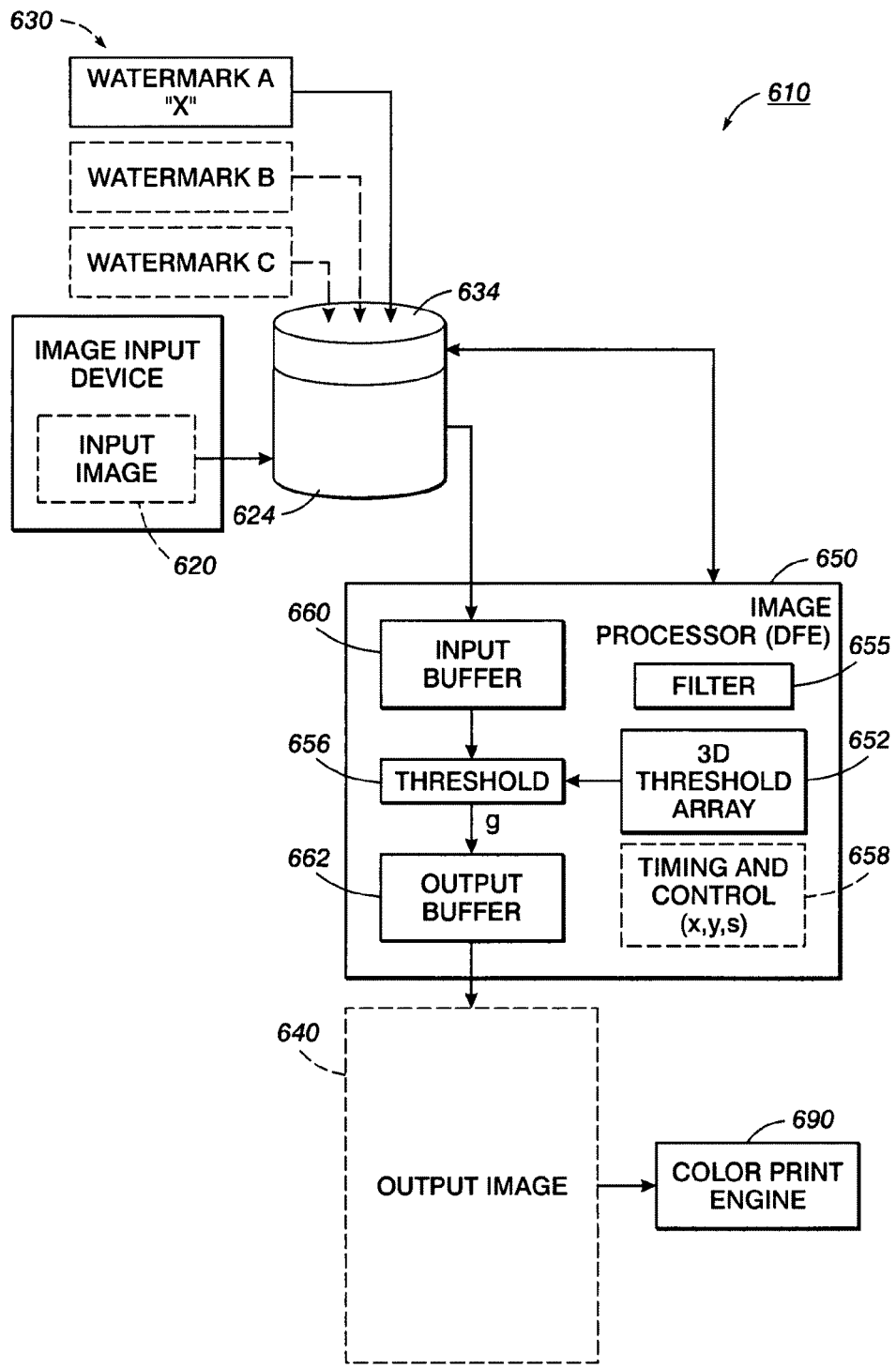
FIG. 6 is a block diagram depicting an embodiment of the system and related methods described herein.

Briefly, the watermark embedding process can be summarized as the series of steps generally illustrated in accordance with the block diagram of FIG. 6. FIG. 6 is an illustration of an exemplary color image processing system 610, suitable for carrying on digital watermarking of a multi-bit/pixel grayscale or color input image. The system 610 includes an image input device, as a source of an input image 620, such as a scanning device, a computer or image workstation for generating images, or a digital camera. The digital input image is at least temporarily or partially stored in an image memory 624.

Memory 624, although depicted as a hard disk, may be any suitable media or installed circuitry including RAM and ROM, removable and permanent and various combinations thereof as are commonly known and used for the storage of digital data such as images. As will be further appreciated the memory 624 may be employed merely as a buffer just for the temporary storage of a portion of the image during processing as described herein.

Similarly, a watermark memory 634 is employed for storing at least one watermark 630 to be embedded in the output image to be created from the stored input image. As noted above, the watermark images may be grayscale images (e.g., 8-bit or n-bit/pixel), as well as variable data watermarks that include information that changes based upon user requirements or other conditions (date stamp, lot number, printing run, etc.) System 610 further includes an image processor 650 or similar control and processing circuitry, such as a digital front end (DFE) known for use in the processing of digital images for rendering on various printing engines (color or black/white) and reprographic devices (e.g., Xerox® iGen3™, DocuColor™ and WorkCentre™ systems, etc.). The processor is employed for embedding digital watermarks 630 into the output image 640, wherein the watermark is embedded into a at least one layer of the output image. As will be appreciated the output image 640 may be rendered on an image output device such as a suitable marking or printing engine 690 capable of rendering a black/white or color output on one or more media.

First, system 610 generates a three-dimensional (3D) threshold array 652 as described in the embodiments above, and stores the result into a memory. Alternatively, the threshold values for a plurality of given x, y and s values can also be calculated pixel-wise or in real-time during the embedding process using Equation 2 above. Storing the pre-calculated result into the processor memory, in 3D threshold array 652 is intended for speeding up the halftone process, albeit requiring more memory than a calculation/processing intensive approach. Accordingly, it will be appreciated that various halftone result generation and storage techniques may be employed in various alternative embodiments. Such techniques include, for example, image processing algorithms implemented in accordance with the equations set forth herein to produce the shifted watermark image, as well as off-the-shelf or custom-designed integrated circuitry (chips) or the like. The 3D threshold array may have a particular advantage in one embodiment (e.g., speed) whereas alternative methods for accomplishing the same function may be particularly applicable in alternative embodiments (e.g., reduced memory size).

Next, for a given watermark pattern 630, a low-pass filter 655 may be applied to smooth out edges of the watermark image and the resultant image is then stored in memory as a multi-bit gray image (e.g., 8-bit), where the different gray levels represent different phase shifts for watermark embedding. If the original watermark pattern does not contain any high-frequency details, it is unlikely that the watermark will be detected when embedded into the output image and this step may be omitted. The input image 620 and the processed watermark image(s) obtained previously are then read in by the image processor and a pixel-wise halftoning operation is conducted. In accordance with the disclosed embodiments, the three-dimensional threshold array 652, stored in memory accessible to the processor 650, is employed as an input to a threshold operation 656. In response to location coordinates x and y, the input value from the input image, and the threshold value determined by the coordinates x, y, and the phase shift s given by Equation 3, a resulting gray level g is determined for a plurality of coordinate locations to produce the processed watermark image 640.

As will be appreciated by those familiar with the design of image processing systems, the image processor 650 further includes timing and control operation block 658, which controls the flow of data and processing operations within the image processor, including any buffering of the image data as depicted in buffers 660 and 662. A wide variety of hardware may be employed to achieve the functionality depicted with regard to the image processor, including dedicated image processing chipsets and conventional computer workstations, as well as combinations thereof or other processing devices.

Once processed, the invisible digital watermark is embedded into the output image 640. The watermarked image containing the embedded invisible digital watermark, is then provided as input to a printing engine for rendering, wherein at least one of the layers or channels in the image includes the invisible digital watermark therein.

Figure 7A:
Figure 7B:
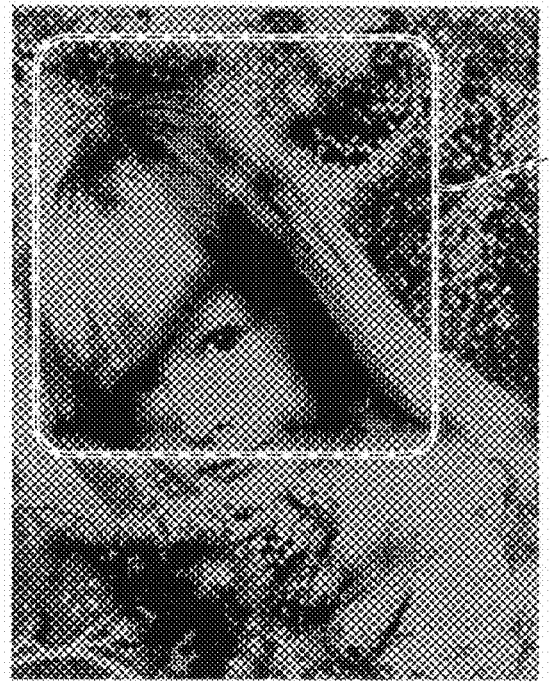
FIG. 7B depicts the retrieved correlation mark within the image.

An example of halftone images with invisible digital watermarks embedded using the disclosed system and method is shown in FIGS. 7A-B and 8. In FIG. 7A a black/white halftone image is depicted with an embedded watermark (representing what would be seen in a watermarked image) and in FIG. 7B the retrieved correlation mark (510) is illustrated. The public key used in the watermark retrieval may be a standard checkerboard pattern matching the halftone screen used for embedding.

It is further believed that the disclosed embedding method(s) provide a solution to embed any watermark pattern represented by 8-bit gray images. Although high frequency details of the watermarks may not be shown upon retrieval, the trade-off between watermark capacity and the hiding effect is under control. The input image and the watermark image are independent until conducting the halftoning process, thus, a run-time embedding feature for variable-data watermarks can be quickly added into most printing systems.

It is further conceived that a more elaborate pattern may be employed as the public key in order to make detection of the embedded watermark even more difficult. Of course, the public key information must also correlate with the watermark embedding process. It will also be appreciated that embodiments of the system and method may include retrieving watermarks from images that have a watermark embedded as described above. One example of a method for retrieving watermarks is also disclosed in U.S. Pat. No. 6,252,971 for "Digital Watermarking Using Phase-Shifted Stoclustic Screens," by S. Wang, issued Jun. 26, 2001, which is hereby incorporated by reference in its entirety.

With the correlation-mark technology, the watermark may be embedded in one or more colors or channels using a dot-on-dot screening method, where the same halftone frequency and angle are used for each color.

It will be appreciated that various of the above-disclosed embodiments and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

What is claimed is:

1. A method for digital watermarking of an image, comprising:
receiving the image to be watermarked;
determining the watermark to be embedded in the image;

embedding an invisible digital watermark into the image using a multi-dimensional threshold operation, wherein at least one input thereto is a phase shift value such that the threshold applied at any particular pixel is chosen using the phase shift value; and outputting the watermarked image containing the embedded invisible digital watermark.

2. The method according to claim 1, wherein the multi-dimensional thresholding operation includes using a three-dimensional threshold array to alter data for a plurality of pixel locations within the image.

3. The method according to claim 2, wherein embedding an invisible digital watermark into the image using a three-dimensional threshold array includes applying a phase-shift transition therewith.

4. The method according to claim 3, wherein applying a phase-shift transition further comprises, for a given location with coordinates x and y, choosing an input value from the image and a threshold value determined by the coordinates x and y, for a phase shift s, and where a resultant gray level g is read from the processed watermark image.

5. The method according to claim 1, further comprising applying a low-pass filter to the watermark image before embedding the watermark.

6. The method according to claim 3, wherein the phase-shift is determined relative to a zero-shift halftone screen.

7. The method according to claim 1, wherein the watermark is a grayscale image having n bits/pixel.

8. The method according to claim 1, wherein the watermark includes variable data.

9. The method according to claim 1, wherein the image to be watermarked is a grayscale image represented by multiple bits/pixel.

10. A method for digital watermarking of an image, comprising:

receiving the image to be watermarked;

determining a watermark to be embedded in the image;

embedding the watermark into the image using a multi-dimensional threshold array including applying a phase-shift transition therewith, wherein at least one input thereto is a phase shift value, wherein applying a phase-shift transition further comprises, for a given location with coordinates x and y, choosing an input value from the image and a threshold value determined by the coordinates x and y, for a phase shift s, and where a resultant gray level g is read from the processed watermark image; and outputting the watermarked image containing the embedded digital watermark, wherein the image includes an invisible digital watermark.

11. The method according to claim 10, further comprising applying a low-pass filter to the image before embedding the watermark.

12. The method according to claim 10, wherein the phase-shift is determined relative to a zero-shift halftone screen.

13. The method according to claim 10, wherein the watermark is a grayscale image having n bits/pixel.

14. The method according to claim 10, wherein the watermark includes variable data.

15. A system for digital watermarking of an image, comprising:

an input image source;

image memory for storing the input image to be watermarked;

watermark memory for storing the watermarks to be embedded in the image; and an image processor for embedding a plurality of invisible digital watermarks into the image, said image processor including a multi-dimensional threshold array where at least one input thereto is a phase shift value retrieved from memory associated with said image processor, such that a threshold selected from said multi-dimensional threshold array and applied at any particular pixel is chosen using the phase shift value, and wherein the watermark is embedded into the image.

16. The system of claim 15, further comprising a low-pass filter, operating in conjunction with said image processor, to smooth edges of the watermark image prior to embedding.

17. The system of claim 15, wherein said watermark memory includes a source of variable data.

* * * * *